United States Patent [19]
Griffiths

[11] Patent Number: 5,857,430
[45] Date of Patent: Jan. 12, 1999

[54] MAGNETIC DISPLAY APPARATUS FOR AQUARIUM

[76] Inventor: Gerald Keith Griffiths, 3312 Clemens, St. Charles, Mo. 63301

[21] Appl. No.: 810,652

[22] Filed: Mar. 3, 1997

[51] Int. Cl.$^6$ .............................. A01K 63/00; H01F 7/20
[52] U.S. Cl. ........................................... 119/256; 248/467
[58] Field of Search .................... 119/247, 253, 119/256, 257; 248/309.4, 467; 446/135, 136, 137; 40/600

[56] References Cited

U.S. PATENT DOCUMENTS

| | | | |
|---|---|---|---|
| 2,637,138 | 5/1953 | Doran et al. | 446/135 X |
| 2,918,284 | 12/1959 | Baca | 446/136 |
| 3,827,020 | 7/1974 | Okamoto | 248/309.4 X |
| 3,986,296 | 10/1976 | Hamano | 446/136 |
| 4,678,150 | 7/1987 | Newman et al. | 248/467 X |
| 4,820,556 | 4/1989 | Goldman et al. | 119/253 X |
| 5,189,821 | 3/1993 | Lee | 446/136 X |

FOREIGN PATENT DOCUMENTS

| | | | |
|---|---|---|---|
| 497373 | 1/1929 | Georgia | 40/600 |

*Primary Examiner*—Michael J. Carone
*Assistant Examiner*—Elizabeth Shaw
*Attorney, Agent, or Firm*—Polster, Lieder, Woodruff & Lucchesi LC

[57] ABSTRACT

Apparatus (10) for attaching an object (O) to a sidewall (S) of an aquarium (A). A magnet (18) is attached to an object to be placed inside the aquarium. A niche or pocket (14) is formed in the side (16) of the object which will abut the inside wall of the aquarium. The niche or pocket is sufficiently large to accommodate the magnet which is affixed in place by any suitable means. A second magnet (24) is positioned on the outside of the wall adjacent the object. The magnetic attraction between the two magnets serves to hold the object in place, even if the object is positioned below the waterline (L) in the aquarium.

15 Claims, 3 Drawing Sheets

MAGNETIC DISPLAY APPARATUS FOR AQUARIUM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to aquariums for displaying or exhibiting fish, and more particularly, to a magnetic display apparatus by which rocks, tree limbs and other decorative artifacts can be attached to a sidewall of the aquarium.

Aquariums are generally four sided glass tanks which are filled with water and used to display fish, crustaceans, and other aquatic life. It is not uncommon for an aquarium to have rocks and rock formations, tree branches, and other decorative artifacts placed on the bottom of tank for the marine life to move around, through and about. If there is a substantial volume of this material, it will not only cover the bottom of the tank but do so to a depth that the material starts to cover the bottom portion of the sidewalls of the aquarium as well. It sometimes may be desirable, for the overall appearance of aquarium, to want to attach an object to the an inside wall of the tank at a level above that of the other material placed in the tank. Heretofore, that has been difficult to do. For example, an artifact could be taped or glued to the wall of the tank, but this requires draining the tank and refilling it. In addition, prolonged submersion in the water may cause the glue or tape to lose its adhesiveness, causing the object to dislodge. A hole could be drilled through the sidewall of the aquarium to allow the object to be set in place using a screw or the like. This again requires draining and refilling of the tank, in addition to providing a waterproof seal about the hole. If the object is later removed, the hole must be filled which may leave an unsightly appearance.

It would be beneficial therefore to provide apparatus which permits an object to be readily and removably attached to the inside wall of an aquarium, below the waterline, as well as to permit the object to be easily repositioned if so desired.

BRIEF SUMMARY OF THE INVENTION

Among the several objects of the present invention may be noted the provision of apparatus for attaching objects or artifacts to a sidewall of an aquarium;

the provision of such apparatus by which the artifact is readily installed below the waterline inside the tank without the tank having to be drained or refilled;

the provision of such apparatus in which the artifact is not only easily installed and removed, but is also readily repositioned from one place to another;

the provision of such apparatus which does not require modification of the aquarium such as by drilling a hole in a sidewall of the aquarium, or scraping off the remnants of glue or tape which might otherwise be used to hold an object in place;

the provision of such apparatus by which an object or artifact set in place remains in place for prolonged periods of time and is not dislodged by someone or something bumping into the aquarium, or by moving the aquarium from one place to another;

the provision of such apparatus to employ a magnet attached to the object or artifact to be placed in the aquarium, the magnet not being detectable by observers of the aquarium when the object or artifact is in place;

the provision of such apparatus to use either a second magnet placed on the outside of the aquarium in abutting relationship to the object, or a mat having a plurality of pockets for holding magnets, the mat being draped over the outside wall of the aquarium;

the provision of such apparatus by which a magnet is attached to the object placed inside the tank by forming a niche or pocket in the object and fitting a magnet therein with the outer surface of the magnet being flush with the outer surface of the object;

the provision of such apparatus in which the magnet attached to outside of the tank is sufficiently large to cover a substantial portion of the sidewall of the tank, the outer surface of the magnet having a decorative seascape or other scene imprinted on it; and, the provision of such apparatus to provide a low cost yet effective way of providing additional ornamentation within the aquarium to enhance the viewing pleasure of those looking at the aquarium.

In accordance with the invention, generally stated, a magnet is attached to an object or artifact which is to be placed inside an aquarium. A niche or pocket is formed in the side of the object which will abut the inside wall of the aquarium, the niche or pocket being sufficiently large to accommodate the magnet. The magnet is affixed in place by any suitable means. A second magnet is positioned on the outside of the wall adjacent the object. The magnetic attraction between the two magnets serves to hold the object in place, even if the object is positioned below the waterline in the aquarium. Other objects and features will be in part apparent and in part pointed out hereinafter.

BRIEF DESCRIPTION OF THE SEVERAL VIEWS OF THE DRAWINGS

In the drawings.

Corresponding reference characters indicate corresponding parts throughout the drawings.

DETAILED DESCRIPTION OF THE INVENTION

Figure 1:
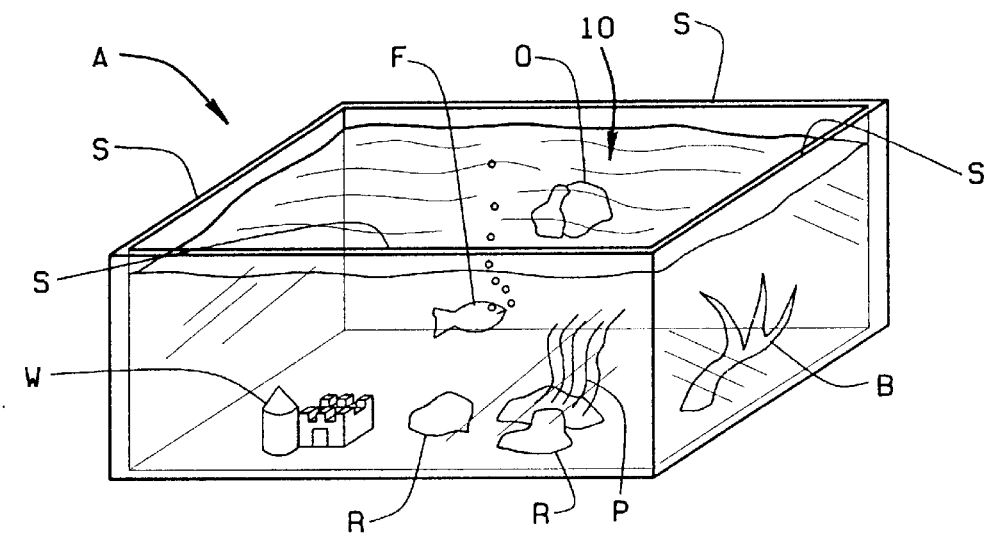
FIG. 1 is a view of an aquarium with an object affixed to a sidewall of the aquarium beneath the waterline.
Figure 7:
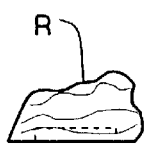
FIG. 7 illustrates a rock in which a magnet is set for holding the rock against a sidewall of the aquarium.
Figure 8:
FIG. 8 illustrates a tree limb in which a magnet is similarly set.
Figure 9:
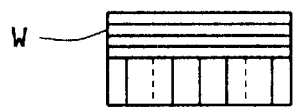
FIG. 9 illustrates a whimsical object such as chest in which a magnet is similarly set.

Referring to the drawings, an aquarium is indicated generally A in FIG. 1. The aquarium has four (4) sidewalls S, and a bottom. The aquarium is open at the top. The sidewalls and bottom define a tank which is filled with water to a level L. As is well-known, a fish F, crustaceans (not shown), and other marine life dwell in the tank. The sidewalls of the tank are usually transparent to allow people to observe the marine life as it swims or moves through the tank. It is also common to place objects in the tank. In FIG. 1, rocks R, a tree limb B, plants P, and a whimsical object W such as a model castle are shown sitting on the floor of the aquarium. In accordance with the teachings of the invention, an apparatus 10 is provided which allows for an object O to be affixed to a sidewall of the aquarium. As shown in FIGS. 7–9, the object may be a rock, tree limb, a whimsical object, or some other type of object.

Figure 2:
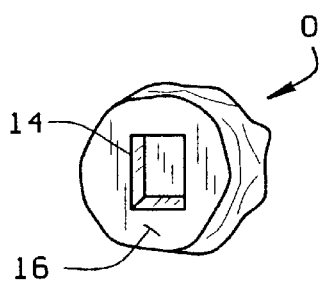
FIG. 2 is a perspective view of a portion of the object with a pocket formed in it for holding a magnet.
Figure 3:
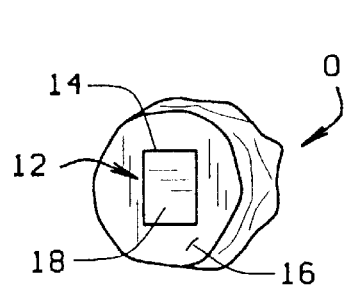
FIG. 3 illustrates the object with the magnet installed.
Figure 4:
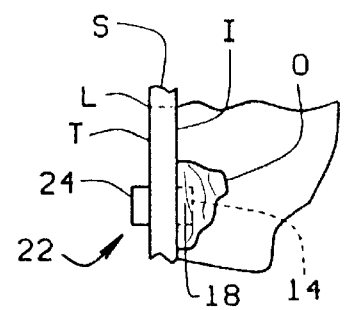
FIG. 4 illustrates attachment of the object to the sidewall using a second magnet.

Apparatus 10 includes a first magnet means 12 which is attached to the object. For this purpose, the object has a pocket or niche 14 formed in one side 16 as shown in FIG. 2. The first magnet means includes a magnet such as a bar magnet 18, and the depth of the pocket or niche is such that when the magnet is secured in place, it is flush with the outer surface of the object as shown in FIG. 3. This allows the surface of the object, and the attached magnet, to abut an inside wall I of the aquarium as shown in FIG. 4. The apparatus further includes a second magnet means 22 positioned on an outside wall T of the aquarium adjacent the object. As shown in FIG. 4, by positioning the second magnet means, which is, for example, a bar magnet 24, adjacent the object, the magnetic attraction between magnets 18 and 24 serves to hold the object in place against the sidewall of the aquarium. This, even if the object is positioned below waterline L in the aquarium. By forming the pocket or niche in the object so a magnet 18 fits flush with the surrounding outer surface of the object, the magnet will not be observable by a viewer when the object is affixed in place. Magnet 18 is secured in the niche by a friction fit; or, the magnet may be glued or otherwise secured in place. Also, while magnets 18 and 24 are shown to be bar magnets, they may have other convenient shapes without departing from the scope of the invention. It will be further understood that the size of the magnets may vary so that smaller magnets are used to attach small objects to a sidewall of the aquarium, and larger magnets may be used for attaching larger or heavier objects. If an object is particularly large, more than one magnet 18 and magnet 24 are used to affix the object to the sidewall of the tank. Here, the magnets could be located at each end of the object. Finally, it will be appreciated that the magnets allow the object to be easily installed at a desired location and readily removed or moved from one location to another so that the aquarium display can be easily changed.

While an object is shown in the drawings as being affixed to one sidewall of the aquarium, apparatus 10 will enable an object to be affixed to two adjacent sidewalls as well. Thus an object which fits around a corner of the aquarium or across the tank from one side to another can be held in place by using one magnet 18 attached to each portion of the object contacting an inside wall surface I of the aquarium and a magnet 24 on the outside surface T of the wall adjacent the magnet 18.

Figures 5A, 5B:
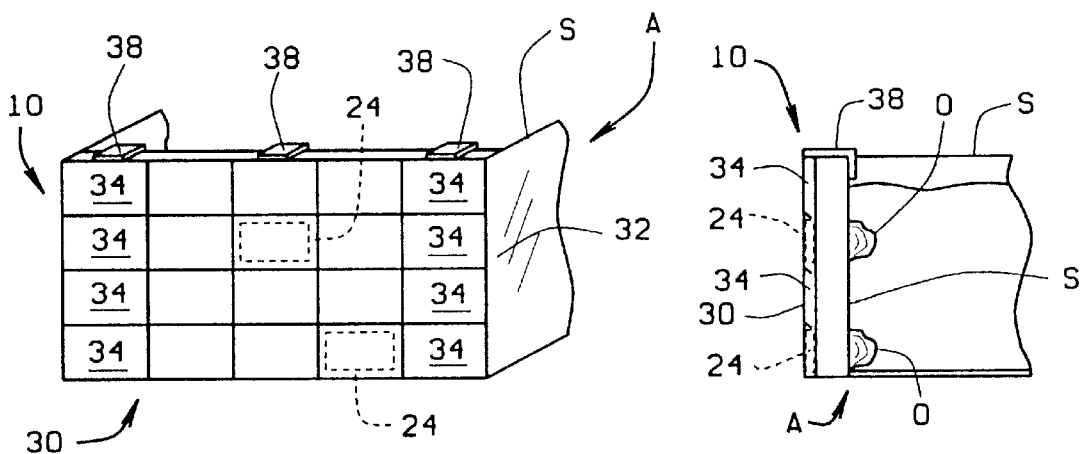
FIGS. 5A and 5B illustrate a mat holding one or more magnets, the mat being draped over the outside of the aquarium using hangars.

Referring to FIGS. 5A and 5B, apparatus 10 is shown to additionally include a means 30 for holding one or more of the magnets 24 so that a number of objects can be simultaneously attached to a sidewall of the aquarium. Means 30 includes a mat 32 having at least one pocket, and preferably a plurality of pockets 34. Each pocket is sized to hold one of the second magnets 24. For this purpose, each of the pockets may be the same size; or, for attaching large objects to a sidewall of the aquarium, the pockets may be larger in size to accommodate a bigger magnet. Mat 30 also includes a means 36 for attaching mat to an aquarium sidewall. Means 36 includes a plurality of hangars 38 which fit over the top of a sidewall to allow mat 30 to be suspended from the top surface of the sidewall. It will be understood that while mat 30 is shown in FIG. 5A as extending across the entire width of an aquarium sidewall, the width of the mat may be such that the mat extends across only a portion of the sidewall and may be placed to one side of the sidewall as well as in the middle.

Figures 6A, 6B:
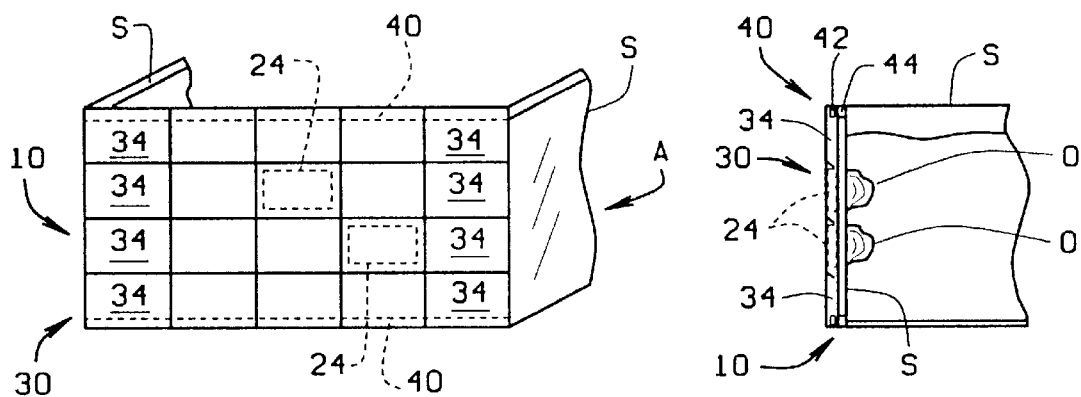
FIGS. 6A and 6B are views similar to FIGS. 5A and 5B but in which the mat has magnets along its edges for attaching the mat to the outside of the aquarium wall.

Referring to FIGS. 9A and 9B, an alternate means 40 of attaching mat 30 to a sidewall includes a third magnet means 40 located along one edge of the mat. As shown in FIG. 6B, means 40 includes a magnet 42 sewn into a lining across the top edge of the mat. Another magnet 44 extends across the top edge of the sidewall of the aquarium. The magnetic attraction between magnets 42 and 44 allow mat 30 to drape down along the outside of the wall. With respect to the embodiments shown in FIGS. 5A–6B, it will be understood that both the mat and magnets are of a transparent material so as to permit viewing of the interior of the aquarium.

Figure 10:
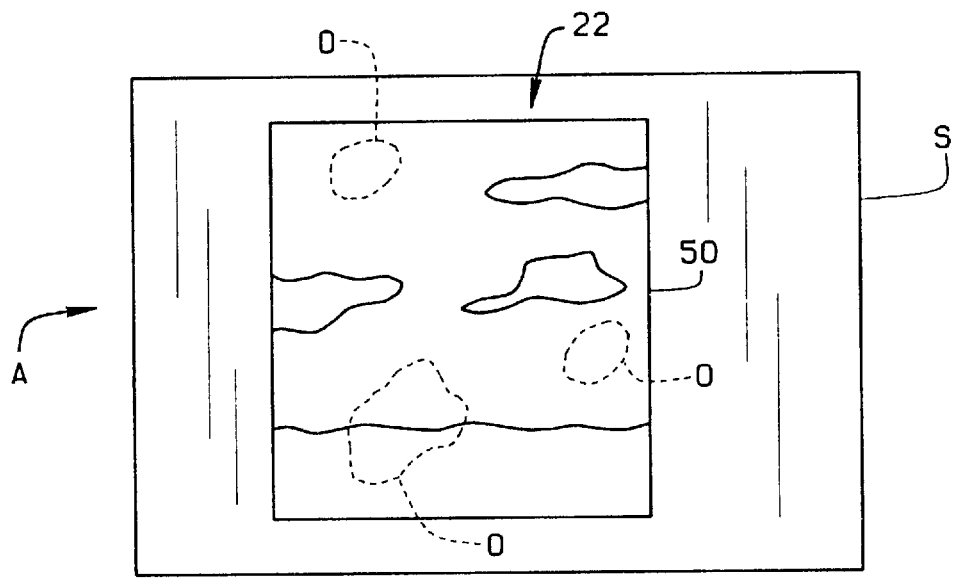
FIG. 10 illustrates another embodiment of a magnet attached to the outer sidewall of the aquarium; and, FIG. 11 illustrates magnets of the invention which have an irregular contour.

As shown in FIG. 10, another embodiment of the second magnet means 22 includes a magnet 50 which is sufficiently large to cover a substantial portion of the surface area of a sidewall of the aquarium. This magnet does not require a holder such as the mats previously described, and can be used to hold in place against the sidewall one or more objects. Also, rather than being of a transparent magnetic material, magnet 50 has an inner surface 52 and an outer surface 54 on either or both of which a decorative scene is imprinted. On the inner surface 52, a seascape may be imprinted; while on the outer surface, a shoreline may be imprinted. However, if desired, no type of scene imprinted may be imprinted on the material from which the magnet is formed.

Figure 11:
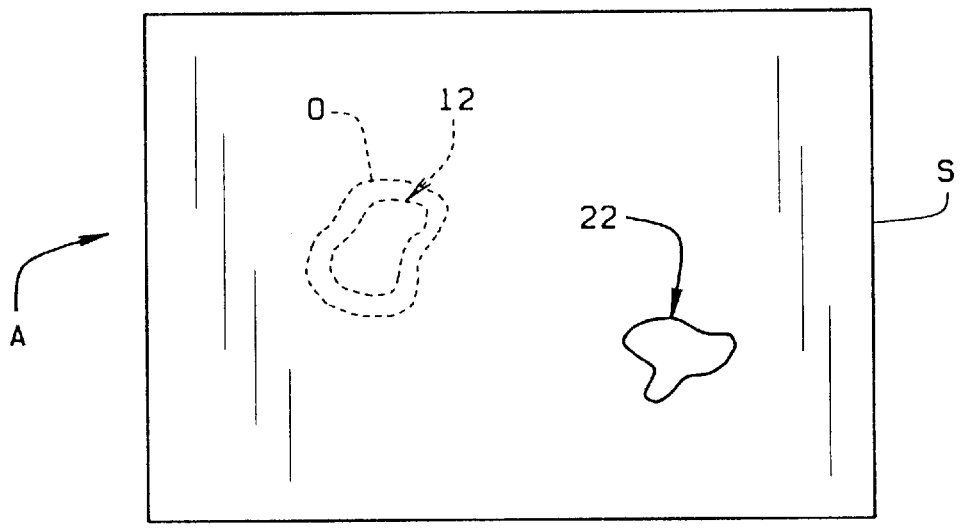

Finally, and as shown in FIG. 11, the respective magnets comprising the first and second magnet means are shown to have an irregular contour. This allows the magnets to be formed such that the shape of the magnets may additionally add to the decor of the aquarium.

What has been described is a method of attaching an artifact such as a rock, tree limb, or whimsical object to a sidewall of an aquarium with the artifact being readily installed below the waterline and without the aquarium having to be drained or refilled. A first magnet is attached to the object by forming a niche or pocket in the object and placing a magnet in the pocket so the outer surface of the magnet is flush with the outer surface of the object. The magnet is thus not detectable. A second magnet placed or installed on the outside of the aquarium adjacent the object to hold it in place. The object can be easily installed and removed, and readily repositioned from one place to another. No modifications to the aquarium or required, and the object will remain in place for long periods of time and is not easily dislodged if the aquarium is bumped or moved.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. An attachment apparatus for an object comprising:

an aquarium having a plurality of walls, said walls having inner and outer surfaces;

a first magnet means attached to the object, the object having a pocket formed in a side thereof which will abut an inner surface of one of said walls, the pocket being sized to accommodate said first magnet means; and, a second magnet means positioned on said outer surface of said one of said walls adjacent the object for a magnetic attraction between said first and second magnet means to hold the object in place, even if the object is positioned below a waterline in said aquarium.

2. The apparatus of claim 1 wherein said pocket is formed in said object so an outer surface of said first magnet means is flush with a surrounding outer surface of said object for said first magnet means to not be observable when said object is affixed in place.

3. The apparatus of claim 2 wherein said first magnet means comprises a bar magnet sized to fit in said pocket.

4. The apparatus of claim 3 wherein said second magnet means also comprises a bar magnet.

5. The apparatus of claim 4 wherein either, or both, of the magnets comprising said first and second magnet means have an irregular contour.

6. The apparatus of claim 1 further including means for holding said second magnet means and attachable to said outer surface of said one of said walls of said aquarium.

7. The apparatus of claim 1 further including a plurality of first and second magnet means for affixing an object to one of said walls of the aquarium, each first magnet means being attached to the object and each second magnet means being position on an outer surface of one of said walls of the aquarium.

8. The apparatus of claim 1 wherein said second magnet means includes a magnet sufficiently large to cover a substantial portion of said outer surface of said one of said walls of the aquarium.

9. The apparatus of claim 8 wherein said second magnet means includes a scene imprinted on either side, or both sides, of the magnet.

10. Apparatus affixing an object to a sidewall of an aquarium comprising:

first magnet means attached to the object, the object having a pocket formed in a side thereof which will abut an inside wall of the aquarium, the pocket being sized to accommodate said first magnet means;

second magnet means positionable on an outside wall of said aquarium adjacent the object for a magnetic attraction between said first and second magnet means to hold the object in place, even if the object is positioned below the waterline in the aquarium; and means for holding said second magnet means and attachable to said sidewall of said aquarium, said means for holding including a mat having at least one pocket therein sized to hold said second magnet means.

11. The apparatus of claim 10 wherein said mat has a plurality of pockets each sized to hold a second magnet means.

12. The apparatus of claim 11 wherein said mat includes means for attachment to said aquarium sidewall.

13. The apparatus of claim 12 wherein said means for attachment includes hangar means along one edge of said mat for suspending said mat from a top surface of said sidewall.

14. The apparatus of claim 13 wherein said means for attachment includes a third magnet means located along at least one edge of said mat, said sidewall of said aquarium having a magnet position able along said top surface of said sidewall for said mat to be suspended adjacent said sidewall by magnetic attraction.

15. The apparatus of claim 14 wherein further said mat and said second magnet means are each of a transparent material to allow clear viewing into the aquarium.

* * * * *